US006760302B1

(12) United States Patent
Ellinas et al.

(10) Patent No.: US 6,760,302 B1
(45) Date of Patent: Jul. 6, 2004

(54) AUTOMATIC PROTECTION SWITCHING SYSTEM IN A NETWORK

(75) Inventors: George Nicos Ellinas, New York, NY (US); Thomas E. Stern, Riverdale, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/331,437
(22) PCT Filed: Dec. 20, 1996
(86) PCT No.: PCT/US96/20598
§ 371 (c)(1),
(2), (4) Date: Aug. 30, 1999
(87) PCT Pub. No.: WO98/28872
PCT Pub. Date: Jul. 2, 1998

(51) Int. Cl.[7] .............................................. H04L 12/26
(52) U.S. Cl. ....................................................... 370/228
(58) Field of Search ................................. 370/216, 218, 370/219, 220, 222, 224, 217, 221, 223, 225, 228, 242, 244, 250, 251, 226, 227

(56) References Cited

U.S. PATENT DOCUMENTS

| | | | | |
|---|---|---|---|---|
| 4,696,001 A | * | 9/1987 | Gagliardi | |
| 5,003,531 A | * | 3/1991 | Farinholt | |
| 5,081,452 A | | 1/1992 | Cozic | ...................... 340/825.5 |
| 5,282,200 A | * | 1/1994 | Dempsey | |
| 5,442,623 A | * | 8/1995 | Wu | |
| 5,444,694 A | | 8/1995 | Millet et al. | |
| 5,751,696 A | * | 5/1998 | Bechtel | |
| 5,757,774 A | * | 5/1998 | Oka | |
| 5,793,745 A | * | 8/1998 | Manchester | |
| 5,949,755 A | * | 9/1999 | Uphadya | |

OTHER PUBLICATIONS

Allan Gibbons (1985) "Algorithmic Graph Theory", Cambridge University Press: pp. 85–93.
T.C. Hu (1982) "Combinatorial Algorithms", Chapter 4, pp. 138–161, Addison Wesley Publishin Company.

* cited by examiner

*Primary Examiner*—Kwang Bin Yao
(74) *Attorney, Agent, or Firm*—Baker Botts LLP

(57) ABSTRACT

A system and method of automatic protection switching for a network (100) which protect against link or node failure. The protection fibers (119, 121) in the links are pre-arranged into protection cycles so that if a link failure occurs, protection switches in the network nodes (101, 107) connected in the failed link will switch the working fiber data path onto an alternate path comprised of protection fibers (119, 121). Data can then be transmitted through the protection cycle around the fault to reach the node on the other side of the failed link. The same protection fibers (119, 121) can be used to protect a priority connection against center switch failure in a network. The protection switches in each node (101, 107) which connect working fibers (115, 117) to protection fibers (119, 121) are very fast and their settings do not depend on the state of the network.

20 Claims, 9 Drawing Sheets

AUTOMATIC PROTECTION SWITCHING SYSTEM IN A NETWORK

The U.S. Government has certain rights in this invention pursuant to award CDR-8421402 by the National Science Foundation.

FIELD OF THE INVENTION

The present invention relates to automatic protection switching systems and methods in networks which incorporate any type of switching and transmission technology.

BACKGROUND OF THE INVENTION

Today's communication systems for delivering data from a source to a destination are typically high-speed, high capacity systems that handle many different types of user services. One example of such a system is an optical fiber network used for telephone traffic or for other data exchange. These advanced networks can transport vast amounts of information at any given time. The networks are conventionally made of links connected to nodes which route information over the network to a desired destination. Since link failures are common for such networks, a fault recovery system is needed to ensure that the data is properly routed to its destination in the event of a fault in a link. While node failures are less frequent, protection against them is also desirable.

Various recovery schemes in the event of a failed link in a network have been proposed but all previous schemes have significant shortcomings. One possible scheme for link failure recovery is a dynamic path rearrangeable mesh architecture. This recovery architecture reroutes transmission paths around a failure point in real time. Spare capacity in the network is used to restore communication on a transmission path when a failure occurs. A control system optimizes the use of available spare capacity by having a node at one end of the failed link broadcast a restoration message to all the other nodes in the network. A node with spare capacity then acknowledges the message and establishes an alternate link from the source to destination. This dynamic method is very time consuming and computationally expensive. The dynamic method has high costs, slow restoration speed, difficult control requirements and the need to constantly plan upgrades to restoration capacity when traffic growth occurs. Additionally, this scheme does not correct for node failures.

Another proposed recovery scheme is a dedicated facility restoration which has dedicated protection links to carry the data if a failure occurs in a link over the main data path. In a "One plus One" protection scheme, the traffic from the source is transmitted simultaneously over both the "main" data path (consisting of links and nodes) and the "backup" data path consisting of a different set of links and nodes. The decision to switch between main and backup data paths is made at the receiving station. In this scheme, fifty percent of the network equipment will always be in standby mode, either operating as a main or backup data path. The main disadvantage of this recovery scheme is that it depends on the connection state of the network. Every time a connection is made from a source to a destination over a link and node data path, a second separate backup link and node data path has to be found to support the main path.

Another proposed dedicated recovery scheme is called the "One for One" protection scheme. This scheme has traffic carried over one path designated the "main" data path with a dormant bearer being the "standby" data path. The main designated data path carries the data until a fault occurs. If a failure occurs, the traffic is switched to the standby data path and remains in that configuration until another failure occurs. Thus fifty percent of the network equipment is always in standby mode. This method is not autonomous but requires end-to-end messages to be transmitted to signal a failure to the source in order to switch data paths. These extra signals add significantly to the cost of operating the network. This recovery scheme also depends on the connection state of the network and every time a connection is made from a source to destination, a second link and node standby path separate from the main path has to be found.

Yet another possible dedicated recovery scheme is a self healing ring. The self healing ring can be either uni-directional or bi-directional. A uni-directional ring has two paths arranged in a ring, composed of a succession of alternating links and nodes, with each link containing two communication lines carrying traffic in opposite directions. Each path carries the same information except that the direction of data propagation is reversed in the second ring. If a link is cut or failed, the network simply relies on the information propagating in the other ring operating in the opposite direction. The receiver of the data can select either path to obtain the data. Every node in the network is connected in the ring. The self healing ring can also be a bi-directional ring with four paths, two main or "working" rings operating in opposite directions and two protection rings, also operating in opposite directions. Each link now has two working lines carrying traffic in opposite directions and two protection lines carrying traffic in opposite directions. Under normal operation (no failures) each working ring carries a portion of the traffic. If a link fails (i.e., all four lines fail), protection switching is used to perform a loop-back function, rerouting the traffic that normally would have used the failed link, around the ring in the opposite direction. This architecture requires a protection line for each working line as in the "one for one" architecture. The main disadvantage of the self-healing ring is that the network topology is limited to a ring including all the nodes. In a ring, there is no capacity for expansion of network traffic since the limited capacity must be shared with all the nodes in the ring. Additionally, a ring can only be protected from a single node or single link failure in the network.

SUMMARY OF THE INVENTION

The present invention is an automatic protection switching system for a network which includes a plurality of network nodes and a plurality of links, each link connecting a pair of nodes. Each link is composed of a pair of working data conduits (communication lines) carrying traffic in opposite directions. In some cases a link may contain more than one pair of working and/or protection conduits. The network nodes contain center switches whose function it is to connect sets of working lines into paths carrying traffic between end user source and destination equipment. They also contain protection switches, whose function is to connect set of protection lines into pre-assigned "protection paths" designed to reroute traffic around a failed link or center switch if a fault is detected. The automatic protection system protects against both link failures and node failures.

The automatic protection system of the present invention is configured by first modeling the network as a graph whose vertices correspond to the net nodes and whose edges correspond to the protection conduits. The pre-assigned protection paths are associated with "protection cycles". Each cycle protects a part of the network, and an appropriate set of protection cycles can be calculated for any network once its topology is known, so that all links and network nodes are protected. When a failure is detected, the protection switches associated with the failed link or center switch are activated, switching the data that would normally use the failed element, onto a path derived from the cycle protecting that element.

BRIEF DESCRIPTION OF THE DRAWINGS

Further objects, features and advantages of the invention will become apparent from the following detailed description taken in conjunction with the accompanying figures showing a preferred embodiment of the invention, in which.

DESCRIPTION OF A PREFERRED EMBODIMENT

Figure 1A:
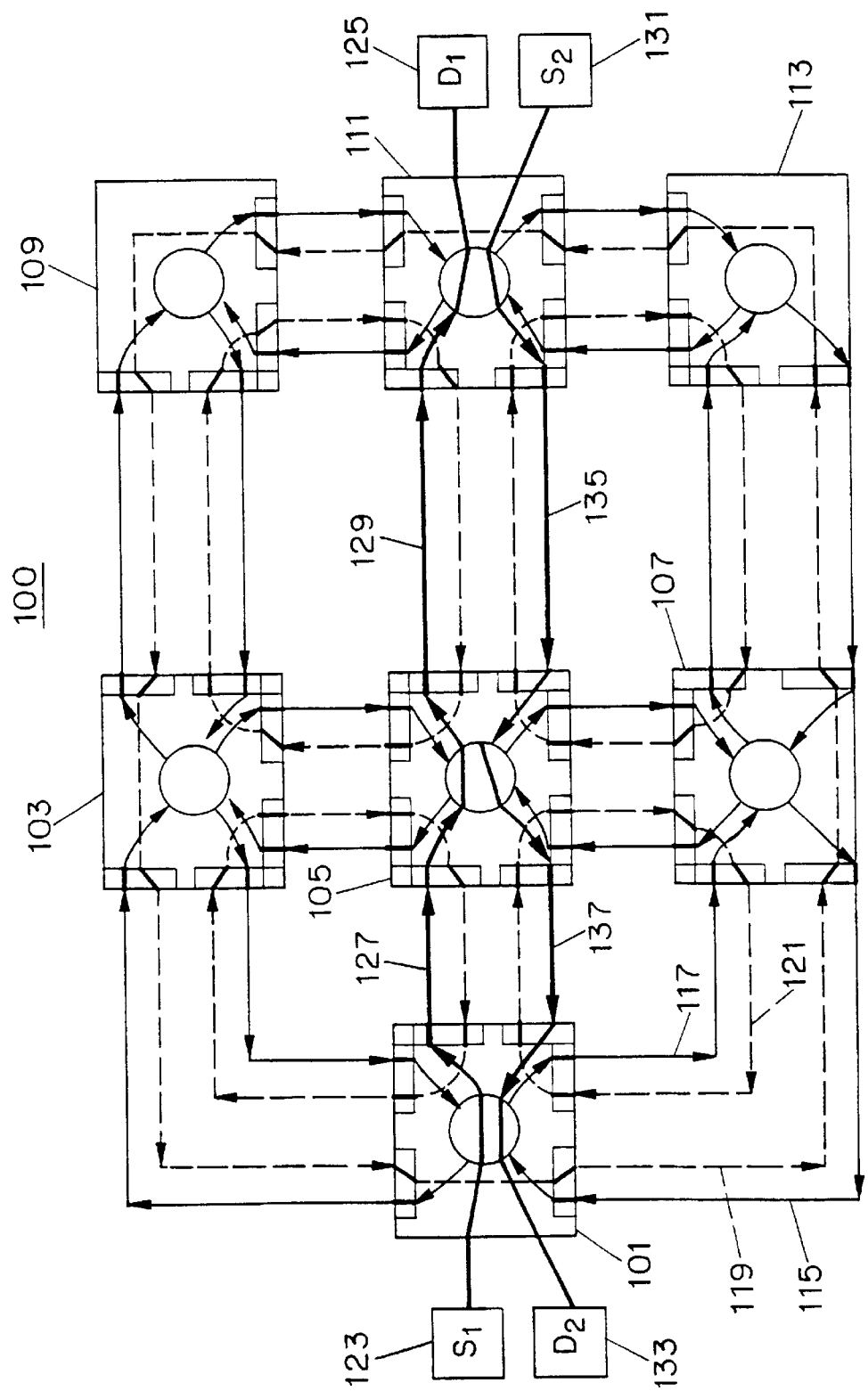
FIG. 1A shows a seven node planar network with bi-directional protection fibers accompanying each bi-directional main fiber.

Automatic protection switching ("APS") for link failures requires rapid recovery from any failure of a network link. Links may be made up of one or more data conduits for transmitting data (including information in any form). In this preferred embodiment, optical fibers will be described as the conduits, so that a link will be composed of pairs of fibers carrying traffic in opposite directions. A network node is any station containing switching equipment, (including protection switches) connected to one or more links and possibly end user equipment, for the purpose of creating data paths between end users over successions of links and intermediate nodes.

A network contains two or more nodes, some or all of which are selectively connected together by links in a particular configuration. In this preferred embodiment, each link in a network contains a number of optical fibers, each of which carries data in a single direction along the length of the link. The fibers could also be any conventional type of transmission line or data conduit. Each fiber is oriented to carry data in a single direction by terminating connections and/or other equipment in the network, e.g., optical fiber amplifiers. A complete link failure occurs when all the fibers in the link are damaged or inhibited and data cannot pass through any of the fibers in the link. In the APS of the present invention, link or node failures are circumvented by re-routing signals from working fibers, which normally carry the data, to protection fibers which are available to carry the data if needed, using protection switches in nodes at the ends of each network link. The protection switches are activated immediately when a fault is detected in the network.

The present invention uses redundancy (protection fibers) to improve the reliability performance of the data transport network. The power and/or Bit Error Rate and/or line overhead information in the signal are monitored at all the links and this information is used to determine when to switch a data path to the protection fibers. Generally, the time it takes to detect a failure and switch to the protection fibers is on the order of milliseconds, e.g. 60 msec. The protection switching is performed at the individual switching nodes without an instruction from a central manager, and thus the APS process is distributed and autonomous. However, the APS switches do require some limited internal protocol in order to coordinate the protection switching process for the entire network.

The link failures described above mean that both the main and protection fibers in the link fail in both directions for that link. The objective of the automatic protection system is to ensure that a valid data path which goes around the failed link is identified in a fast and efficient manner. The data signals that would normally use the failed link are re-routed on a path made up of protection fibers, from the network node (or simply "node") on one side of the failed link to the receiving network node on the other side of the failed link. The APS process of the present invention will restore the failed link in both directions. However, the invention is directed to the more troublesome cases of a complete link failure or failed node in the network.

FIG. 1A shows a planar network with seven network nodes and with bi-directional protection fibers accompanying each bi-directional working fiber. The network nodes 101, 103, 105, 107, 109, 111 and 113 are selectively connected by working fibers (which are centered in links) indicated by the solid outer arrows between the nodes. The arrows indicate the direction in which the data flows. In working fiber 115, data flows from network node 107 to network node 101 while in working fiber 117 data flows in the reverse direction, from network node 101 to network node 107. The protection fibers are shown by dotted arrows in the network. The arrows also indicate the direction of the data flow through the fiber. For example, protection fiber 119 would transfer data from network node 101 to network node 107 if required. Additionally, protection fiber 121 would transfer data from network node 107 to network node 101. As shown in network 100, each link between two network nodes contains two working fibers operating in opposite directions and two protection links operating in opposite directions. A link may contain additional pairs of working and protection fibers.

Also shown in system 100 is an end user source $S_1$ 123 and a corresponding end user destination D 125. The data path between the source and destination in the network 100 is shown operating without any link or node failures by the bold line arrows 127 and 129. The data flows from source $S_1$ 123 in network node 101 to working fiber 127 to network node 105 to working fiber 129 to destination $D_1$ 125 in network node 111. Also shown in system 100 is a second transmission route from a source $S_2$ 131 to destination $D_2$ 133. The data transmission route goes from source $S_2$ 131 in network node 111 to working fiber 135 to node 105 to working fiber 137 to destination $D_2$ 133 in network node 101.

The invention protects against link failures for networks with planar topologies and networks with non-planar topologies. First we describe the protection against link failures for networks with planar topologies.

Figure 1B:
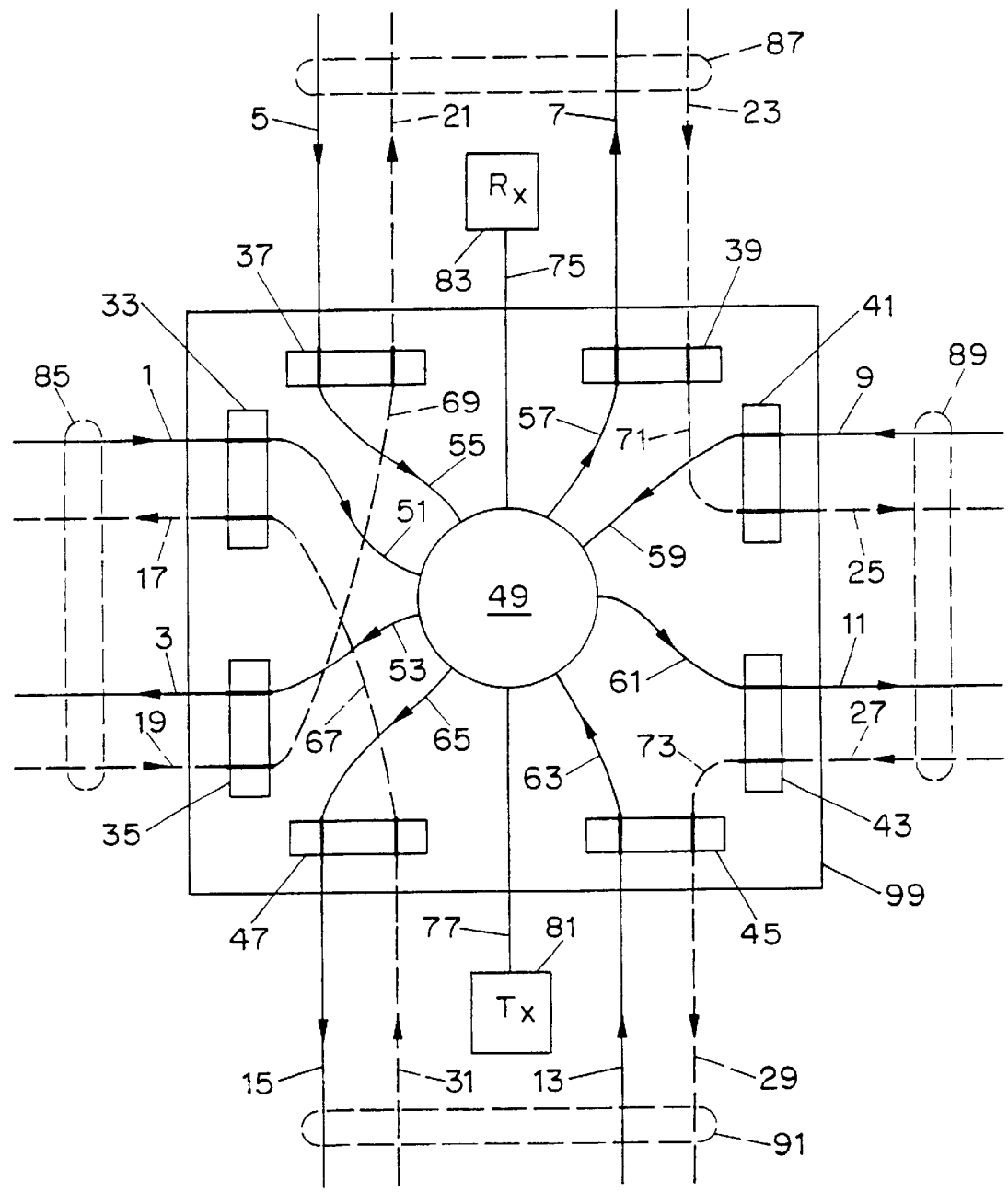
FIG. 1B shows a switching node from FIG. 1A.

FIG. 1B shows a network node 99 connected to other network nodes in a network through four links. Each link includes a pair of working fibers transmitting data in opposite directions. These working fibers are connected to other network nodes not shown in FIG. 1B and a pair of protection fibers, transmitting data in opposite directions. Link 85 includes working fiber pair 1, 3 and protection fiber pair 17, 19. Link 87 includes working fiber pair 5, 7 and protection fiber pair 21, 23. Link 89 includes working fiber pair 9,11 and protection fiber pair 25, 27. Link 91 includes working fiber pair 13, 15 and protection fiber pair 29, 31. These protection fibers are also connected to other network nodes not shown in FIG. 1B. Within each link each working and protection fiber pair transmitting data in opposite directions terminates at a protection switch. In FIG. 1B, working fiber 1 and protection fiber pair 17 in link 85 terminate at protection switch 33, working fiber 3 and protection fiber 19 in link 85 terminate at protection switch 35, working fiber 5 and protection fiber 21 in link 87 terminate at protection switch 37, working fiber 7 and protection fiber 23 in link 87 terminate at protection switch 39, working fiber 9 and protection fiber 25 in link 89 terminate at protection switch 41, working fiber 11 and protection fiber 27 in link 89 terminate at protection switch 43, working fiber 13 and protection fiber 29 in link 91 terminate at protection switch 45, and working fiber 15 and protection fiber 31 in link 91 terminate at protection switch 47. All these working and protection fiber pairs also terminate at protection switches at the other network nodes which are connected to network node 99 but not shown in FIG. 1B. In the preferred embodiment of an optical network, protection switches are opto-mechanical switches but could also be any type of conventional switching devices depending upon the type of network being protected. The state of the protection switches in the network under normal non-failure operation as shown by the protection switch position in FIG. 1B is termed the BAR state. When a failure is detected, some of the protection switches are reconfigured appropriately, as described below.

Network node 99 also contains a center switch 49 which routes information from its incoming to its outgoing ports. In the preferred embodiment of an optical network, center switch 49 can be implemented by an optical switch, an example of which is described by Iqbal et al. in "High Performance Optical Switches for Multiwavelength Rearrangeable Optical Networks", Government Microelectronic Circuits Application Conference (GOMAC) '94, San Diego, Calif., November 1994 (which is hereby incorporated by reference). They could also be any type of conventional switching devices depending upon the type of network being protected. The center switch interconnection settings are in response to commands from a network management entity.

While the network is operating free of failures, working fibers are connected to center switch 49 through protection switches and working interconnection fibers. Working fiber 1 is connected to center switch 49 through protection switch 33 and working interconnection fiber 51. Working fiber 3 is connected to center switch 49 through protection switch 35 and interconnection fiber 53. Working fiber 5 is connected to center switch 49 through protection switch 37 and interconnection fiber 55. Working fiber 7 is connected to center switch 49 through protection switch 39 and interconnection fiber 57. Working fiber 9 is connected to center switch 49 through protection switch 41 and interconnection fiber 59. Working fiber 11 is connected to center switch 49 through protection switch 43 and interconnection fiber 61. Working fiber 13 is connected to center switch 49 through protection switch 45 and interconnection fiber 63. Working fiber 15 is connected to center switch 49 through protection switch 47 and interconnection fiber 65. Protection fibers are interconnected among themselves through protection switches and protection interconnection fibers. For example, protection fiber 17 is connected to protection fiber 31 through protection switch 33, protection interconnection fiber 67 and protection switch 47. Protection fiber 19 is connected to protection fiber 21 through protection switch 35, protection switch 37 and protection interconnection fiber 69. Protection fiber 23 is connected to protection fiber 25 through protection switch 39, protection switch 41 and protection interconnection fiber 71. Protection fiber 27 is connected to protection fiber 29 through protection switch 43, protection switch 45 and protection interconnection fiber 73.

Transmitter 81 and receiver 83 are connected to center switch 49 through access fibers 77 and 75, respectively. Other end user equipment can also be connected if desired.

Figure 2A:
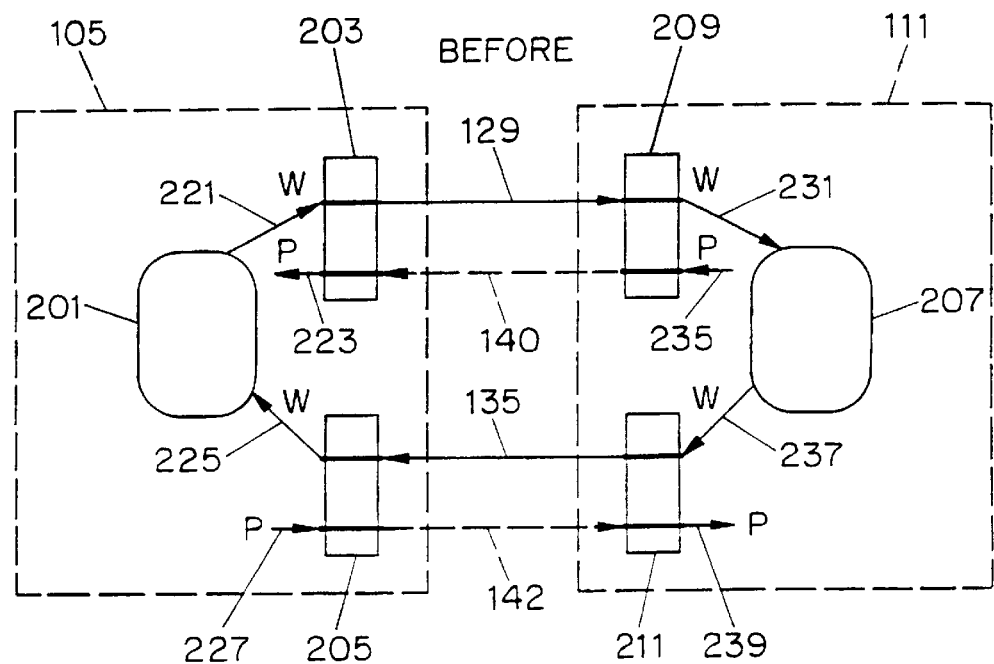
FIG. 2A shows two switching nodes joined by a link before a link failure occurs.
Figure 8:
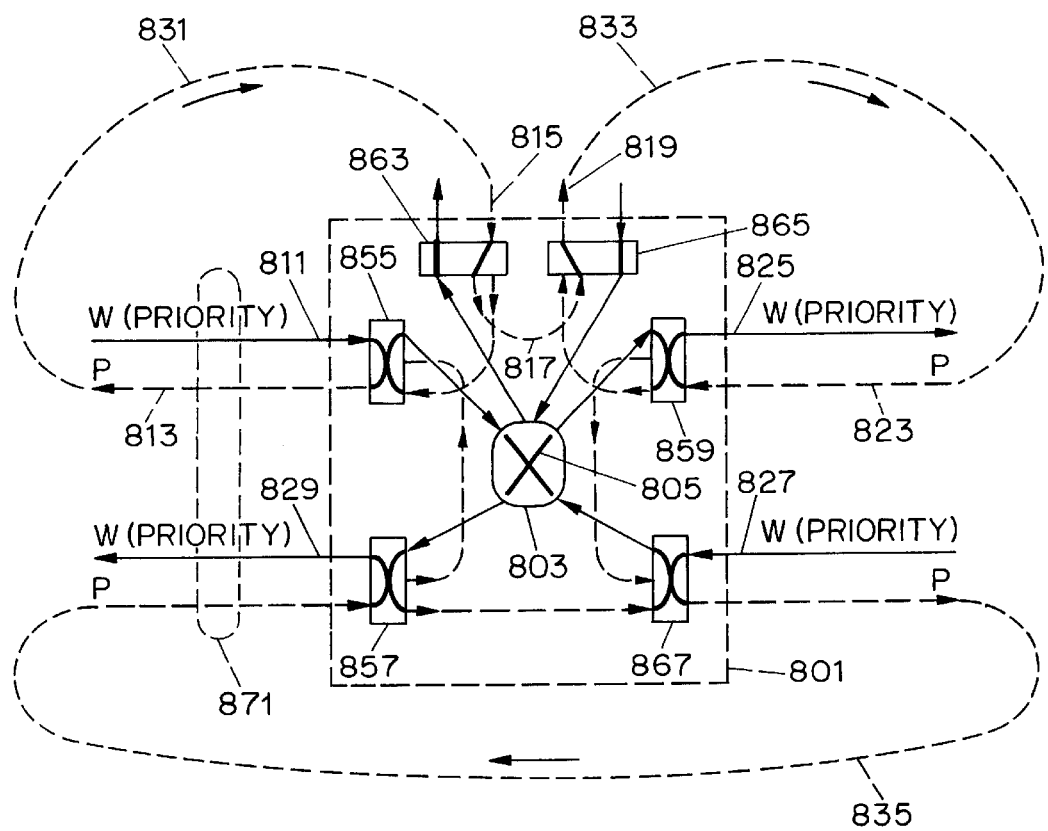
FIG. 8 shows a switching node after an optical switch failure within the node.

FIG. 2A shows the connections between two network nodes which are joined by a link before a link failure occurs. In both network nodes 2×2 protection switches are used which can protect against link failures only. The protection switches are shown in the default BAR state. Larger protection switches which can protect against center switch failures as well, in networks with planar topologies, are shown in FIG. 8. In the preferred embodiment of an optical network, network node 105 from FIG. 2A includes an optical center switch 201 which routes data arriving or leaving network node 105 through working fibers 135 and 129, respectively. It also includes protection switch 203 for connecting working interconnection fiber 221 to protection interconnection fiber 223 if a link failure occurs, and protection switch 205 for connecting working interconnection fiber 225 to protection interconnection fiber 227 if a link failure occurs. Protection interconnection fibers 223, 227, 235, 239 in network nodes 105 and 111 are connected to other protection switches in those network nodes (not shown). In the figures, "W" refers to working interconnection fibers "P" refers to protection interconnection fibers. Network node 105 also contains a pair of protection switches connected to fibers located on each of the three other sides of the network node (not shown). Network node 111 contains an optical switch 207 which routes data arriving or leaving from network node 111 through working fibers 129 and 135 respectively. It also includes protection switch 209 for connecting working interconnection fiber 231 to protection interconnection fiber 235 if a link failure (fault) occurs. Protection-switch 211 is included for connecting working interconnection fiber 237 to protection interconnection fiber 239 if a link failure occurs. Network node 111 also contains a pair of protection switches connected to fibers located on each of the three other sides of the network node (not shown). Each protection switch is assembled with a single working and protection fiber incident to the node. The other network nodes in FIG. 1A have the same type of connections as shown in FIG. 2A.

In the example of FIG. 2A, no link failure has occurred, data flows between the network nodes along working fibers 129 and 135. The protection fibers are not utilized if there are no failures.

Figure 2B:
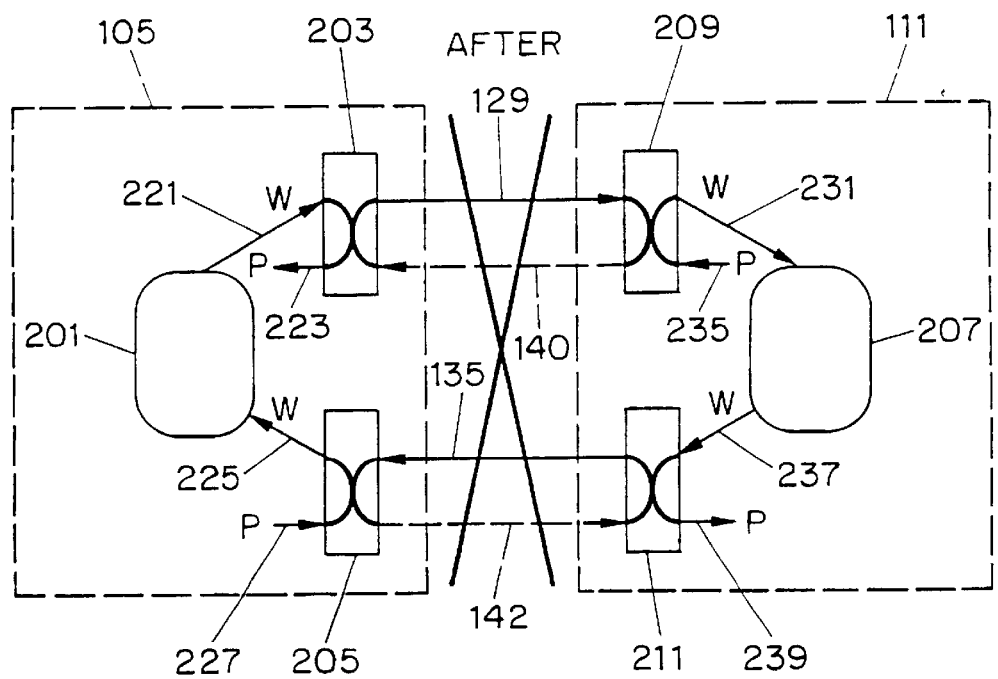
FIG. 2B shows two switching nodes joined by a link after a link failure occurs.

FIG. 2B shows the connections within the two network nodes 105 and 111 of FIG. 2A after a link failure has occurred. The protection switches are now shown in the cross state after the failure. The link failure typically severs all four fibers 129, 135, 140 and 142. When the link failure is detected by the network nodes on either side of the link, e.g., by monitoring the power level of the signals on the working fibers, and comparing it to an acceptable threshold, by line overhead information of the signal or by any other type of failure detection system, the protection switches within the network nodes at both sides of the link failure are set to the cross state, and automatically switch the working fiber data flow onto the associated protection interconnection fibers which are oriented for data flow in the opposite direction from the corresponding working (and working interconnection) fibers. In the example of FIG. 2B, protection switches 203, 205, 209 and 211 can be opto-mechanically operated switches or can be any switching means which operates to redirect the data flow in the network from a working interconnection fiber onto a corresponding protection interconnection fiber and from a protection interconnection fiber onto a corresponding working interconnection fiber.

After a link failure occurs, protection switch 203 in FIG. 2B directs the data that would normally flow over working fiber 129 from network node 105 to network node 111 onto protection interconnection fiber 223 in the direction away from the failed link. After the link failure, protection switch 205 in FIG. 2B also redirects the data so that working interconnection fiber 225, which normally receives data from network node 111 along working fiber 135, now receives data from protection interconnection fiber 227. The automatic protection switching operation to bypass the failed link also occurs at network node 111 on the other side of the failed link. After a link failure occurs, protection switch 211 in FIG. 2B now directs the data that would normally flow over working fiber 135 from network node 111 to network node 105 onto protection interconnection fiber 239 in the direction away from the failed link. After the link failure, protection switch 209 in FIG. 2B also redirects the data that would normally flow over working fiber 135 from network node 111 to network node 105 onto protection interconnection fiber 239 in the direction away from the failed link. After the link failure, protection switch 209 in FIG. 2B also redirects the data. Working interconnection fiber 231 which normally receives data from network node 105 along working fiber 129, now receives data from protection interconnection fiber 235.

The result of the automatic protection switching described above is a redirection of data which would have been passed through the failed link, onto a protection interconnection fiber which will automatically route the data to the other side of the failed link along a protection fiber path in a protection cycle. Additionally, the data which was to reach network node 111 through the failed link is now obtained from a protection interconnection fiber 235 in the protection cycle containing the rerouted data. The other direction is similarly protected through another protection cycle. Thus, the failed link is completely avoided in the transfer of data and the network is restored very quickly to full operation. The failure is detected at the network nodes on both sides of the failed link, and the protection switching is performed within those two network nodes. The protection cycles are made up of the protection fibers and protection interconnection fibers and are pre-determined and set up prior to the activation of the network. No centralized decision process as to which protection fibers must be used in the network to redirect the data in case of a link failure is necessary. This allows for fast, immediate protection of a link failure.

The protection fibers are organized into a number of protection cycles within the network. The term "protection cycle" as used in applicants' specification and claims is a closed loop of unidirectional fibers. In the present invention, each protection fiber is part of one and only one protection cycle in the automatic protection switching system. Also in the invention, a protection cycle will not contain two protection fibers oriented in opposite directions in the same length unless the protection cycle includes a bridge. A bridge occurs when a network node is connected to the rest of the network through a single link. Furthermore, a bridge occurs when a link is the only point of connection between otherwise disconnected parts of a network. If the bridge is severed, the network is cut into two disconnected parts, and there is no way to transmit data between those parts without restoring the link, because there is no alternate pass available.

Figure 3:
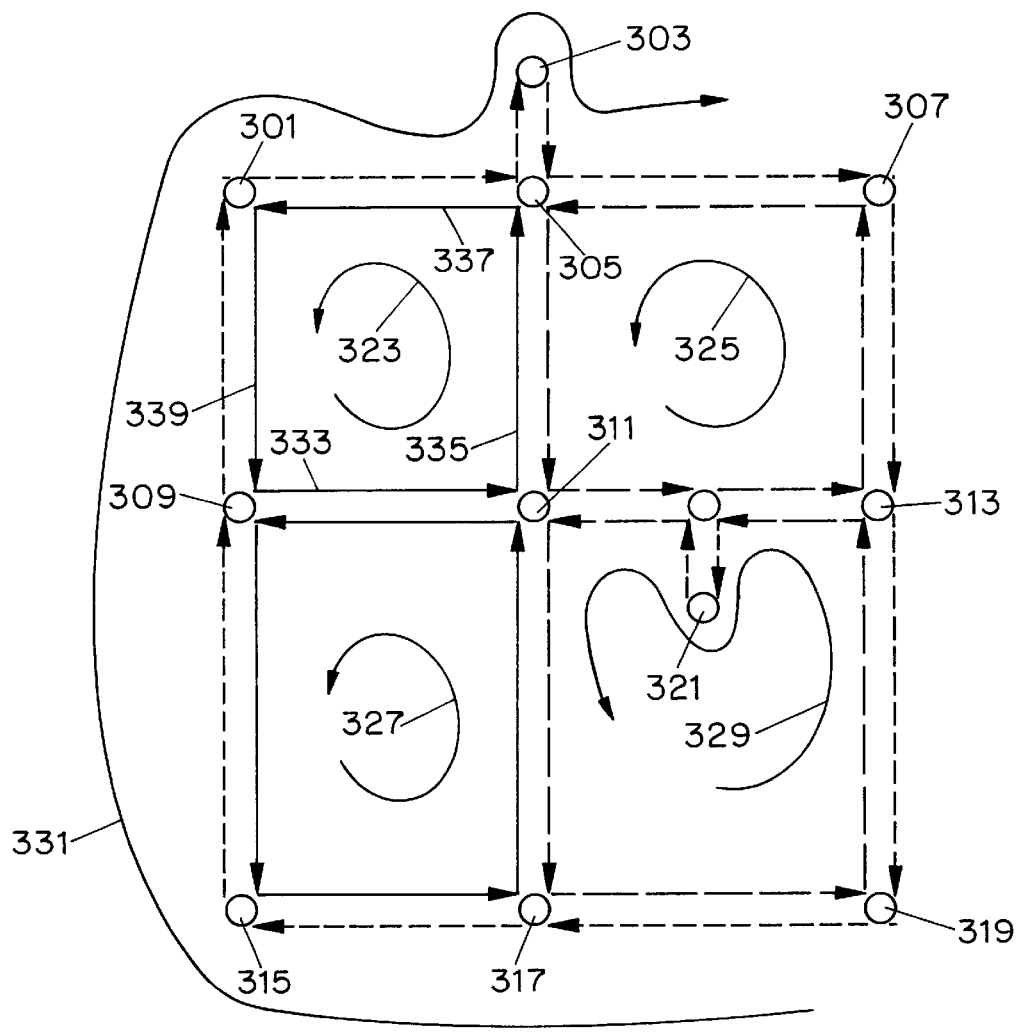
FIG. 3 shows a network with pre-assigned protection cycles in accordance the invention.

The protection cycles, used to protect the network against a link failure, are predetermined by modeling the network as a directed graph with vertices representing the network nodes and directed edges representing the protection fibers in the network. One embodiment of the present invention has a network with a planar topology, hence its corresponding graph is also planar. A graph is planar by definition if its edges can be drawn on a plane so that no two edges intersect at any other point but a vertex. When so drawn, the graph is called a plane graph. FIG. 3 shows a plane graph representation of a network with planar topology, with calculated directed cycles in accordance with the invention. The vertices, representing network nodes 301, 303, 305, 307, 309, 311, 313, 315, 317, 319, and 321 are shown by the small circles in FIG. 3. Directed cycles 323, 325, 327 and 329 are directionally oriented in the same manner, i.e., counter-clockwise, in the inner faces of the plane graph. An inner face of a plane graph is the inside of three or more edges connected together to form a closed space. A directed cycle 331 oriented in the opposite direction, clockwise in this example, is placed around the outside of the planar graph (outer face).

After the appropriate directed cycles are computed in the directed graph representation of the network, the protection switches in the network are interconnected with protection interconnection fibers so that the resulting directed closed paths of protection fibers correspond to the direction cycles found in the corresponding directed graph. For example, directed edges 333, 335, 337 and 339 in FIG. 3 form directed cycle 323. Directed edges 333, 335, 337 and 339 correspond to protection fibers in the corresponding network. The protection switch in network node 311 (modeled as vertex 311 in corresponding graph) that terminates protection fiber 333 is interconnected to the protection switch that terminates protection fiber 335 also in network node 311. This interconnection is made with a protection interconnection fiber. Similarly, the interconnections are made for the protection switches terminating protection fibers 335 and 337 in network node 305, the protection switches terminating protection fibers 337 and 339 in network node 301, and the protection switches terminating protection fibers 339 and 333 in network node 309, all of which create protection cycle 323.

This configuration of the automatic protection switching system achieves the condition of the present invention of having two protection fibers oriented in opposite directions in different protection cycles for every link between two network nodes, unless there is a bridge as previously defined. It also achieves the condition that each protection fiber appears in one and only one protection cycle. Vertices 303 and 321 (representing network nodes) are attached to bridge links because they are connected to the rest of the graph (representing the network) only through one link. If the link that connects network node 303 to network node 305 in the corresponding network is severed, it would not be possible to transfer the necessary information in a protection cycle without repairing the faulty link. If a bridge link failure occurs in the network, there can be no suitable protection for that bridge link. The network node on the other side of the bridge can only receive data from the bridge link itself. Therefore, a network should be designed to minimize the number of bridge links in order to gain maximum operational protection through the use of the protection cycles. If the net topology is modified after initial network activities, through the addition or deletion of network nodes or links, the protection cycles can easily be re-computed to give complete protection to the entire network.

Figure 4:
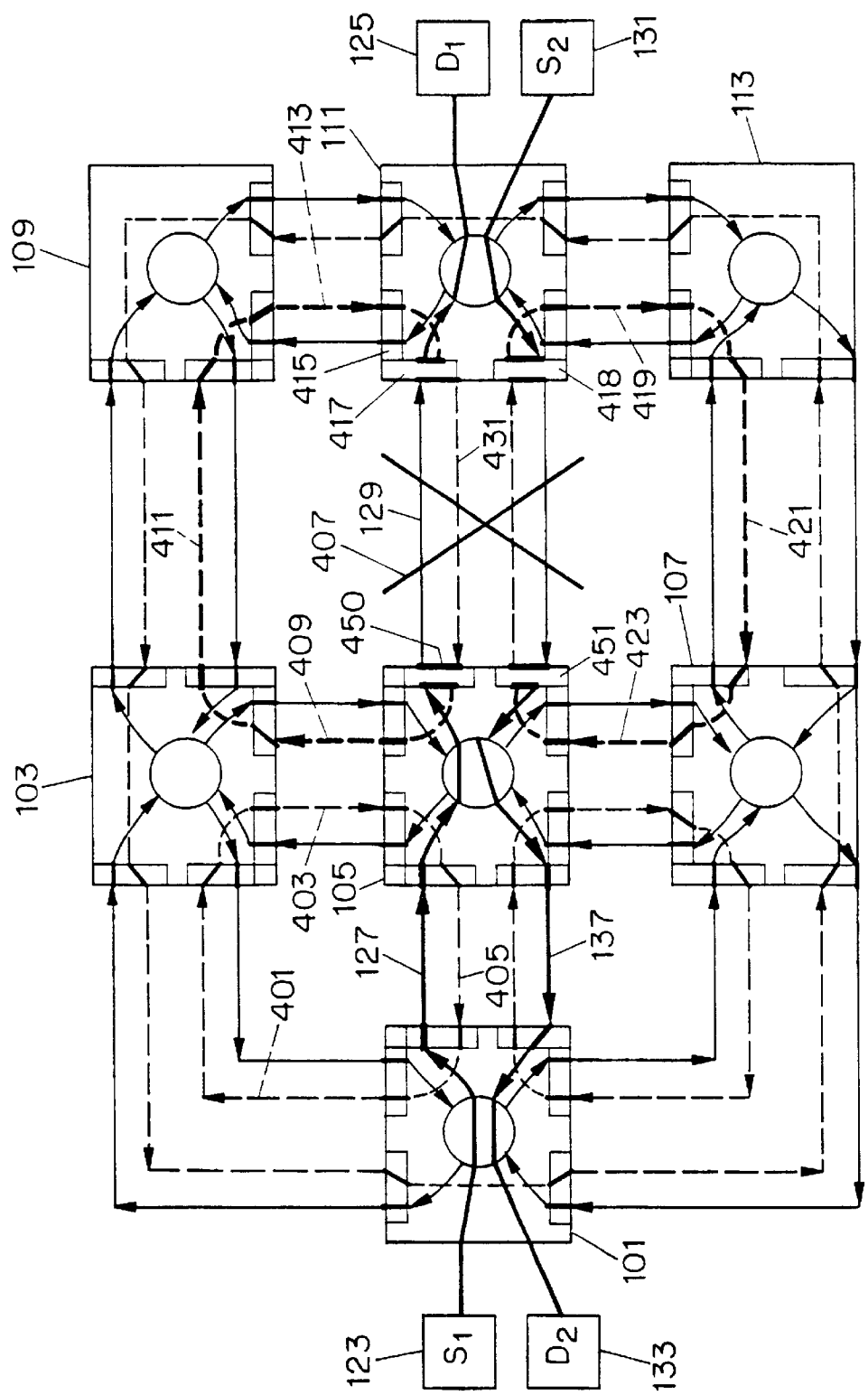
FIG. 4 shows the seven node planar network of FIG. 1 with a single link failure.

FIG. 4 shows the planar network of FIG. 1A with one of the links between the network nodes failing. The network shown has the same configuration as in FIG. 1A and like numbers are used in the description of FIG. 4. The protection switches in the network nodes are interconnected with protection interconnection fibers to create five protection cycles as previously defined. Protection cycles in the network are configured and oriented in a clockwise direction for the inner faces of the network and an additional protection cycle is oriented counter-clockwise around the outer face of the network. One of the inner protection cycles is made of protection fibers 401, 403 and 405. The cycle is a complete data path which allows transportation of data from any single network node in the protection cycle to another network node in the protection cycle. Another of the inner protection cycles is made of protection fibers 409, 411, 413 and 431. The other protection cycles in the network are shown as complete cycles of protection fiber and protection interconnection fiber in a single direction indicated by the dashed line arrows.

A failure indicated by "X" 407 disrupts the connection for the four fibers in the link, two working fibers and two protection fibers, located between network nodes 105 and 111. When the failure is detected by the network nodes on both sides of the failure, the network nodes automatically switch the data path from the working fibers to the protection interconnection fibers, as previously shown in FIG. 2B. After the switching operation is performed, the data path now established for the transmission of data from source $S_1$ 123 to destination $D_1$ 125 is indicated by the combination of bolded working fibers (full line arrows) and bolded protection fibers (dashed line arrows). The data, after link failure protection is enacted, is transmitted from source $S_1$ 123 in network node 101 to working fiber 127 to network node 105 as transmitted before the failure. Now, because network node 105 has switched the transmission path from the working fibers to the fibers in the protection cycle at protection switch 450, the data is transmitted on protection fiber 409 to network node 103 instead of onto working fiber 129. The data path now follows the protection cycle in the clockwise direction along protection fiber 411 to network node 109. The data then flows to protection fiber 413 which arrives at network node 111 through protection switch 415. The data continues along the protection cycle within network node 111 and is directed to protection switch 417 in the network node. Protection switch 417 has been activated when the link failure was detected by network node 111 to direct the data from incoming protection interconnection fiber onto the outgoing working interconnection fiber to destination $D_1$ 125 in network node 111 as shown in FIG. 2. Therefore, data is delivered from source $S_1$ to destination $D_1$ along the new data path including protection fibers just as if the link failure 407 had not occurred. The pre-calculated protection cycles ensure that the data will be delivered along a protection data path to the receiving node on the other side of a failed link if a failure does occur.

The data from the source $S_2$ 131 in FIG. 4 is also transferred to its destination $D_2$ 133 using the protection cycles in the network in the event of a link failure. Because of the link failure 407, the protection switches 417 and 418 have been activated which change the data path from the working interconnection fibers to the protection interconnection fibers, and vice-versa, as shown in FIG. 2B. The data now flows from source $S_2$ 131 in network node 111 along protection fiber 419 to network node 113. The data is then transferred along protection fiber 421, part of one of the protection cycles, to network node 107. The data is then transferred along protection fiber 423 to network node 105. Due to the protection switch 451 setting in network node 105, the data is now transferred back onto working fiber 137 and then to destination $D_2$ 133 in network node 101. The protection cycle in the lower right quarter of the network allows for the proper transmission of the data for this source to destination data transmission.

The protection cycle configuration of the present invention allows for a maximum restoration of $\lfloor f/2 \rfloor$ simultaneous link failures when bi-directional connections are restored and a maximum restoration of (f−1) simultaneous link failures when uni-directional connections are restored, where f represents the total number of faces when the network is represented by a plane graph. The present invention guarantees a restoration of any single link failure (excluding bridges) and allows for possible restoration of multiple link failures depending on the position of the link failures.

Figure 5:
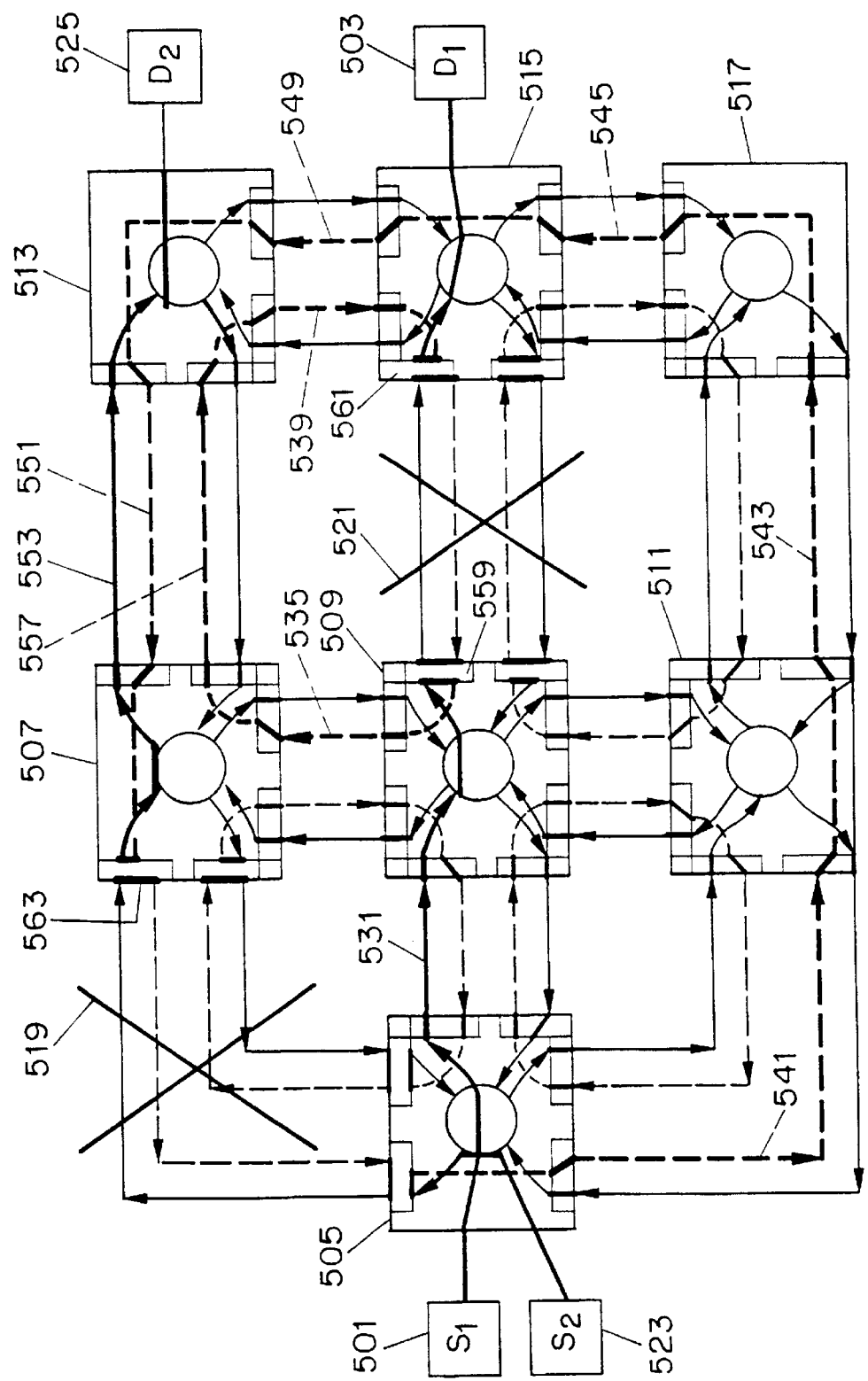
FIG. 5 shows a seven node planar network with two link failures.

FIG. 5 shows a planar network with two link failures. The network nodes and protection cycles are configured in the same manner as in FIGS. 1 and 4. In this example, a link failure "X" 519 has occurred and a link failure "X" 521 has occurred simultaneously in the network. When each failure occurs, the protection switches in the network nodes on both sides of the failures are activated and the data to and from the working interconnection fibers are transferred to and from the protection interconnection fibers as shown in FIG. 2B. The new data path after both link failures is show in the bolded working fibers (full line arrows) and bolded protection fibers (dashed line arrows).

The data paths established after the two link failures will now be described. After detection of the link failures, the protection switches in the network nodes on both sides of each link failure are activated. The data from source $S_1$ 501 traveling to destination $D_1$ 503 travels from source $S_1$ 501 to network node 505 to working fiber 531 to network node 509, in the same manner as before the link failure 521 occurred. Now, due to link failure 521 and the resulting activation of the protection switch 559 in network node 509, the data is transferred to protection fiber 535. The data is then transferred to network node 507 to protection fiber 557 to network node 513 to protection fiber 539 to network node 515. The data follows a protection cycle around the failed link to arrive at the network node on the other side of the failed link and then on to the proper destination. The data is transferred off the protection fibers in the protection cycle in network node 515 because of the activated switch 561. The data is finally transferred to destination $D_1$ 503.

The data from source $S_2$ 523 would normally be transmitted to network node 507 directly and then to network node 513. However, there is a failure indicated by "X" 519 in the link between network nodes 505 and 507. Therefore, the protection switches in network nodes 505 and 507 which are connected to the failed link are activated. The data is then transferred onto protection fiber 541 from network node 505. The data will be transferred along the protection cycle until it reaches the protection switch that has been activated on the other side of the failed link. The data travels from source $S_2$ 523 along the outside (outer face) protection cycle and is sent from protection fiber 541 to network node 511 to protection fiber 543 to network node 517 to protection fiber 545 to network node 515 to protection fiber 549 to network node 513 to protection fiber 551 to network node 507. In network node 507, the protection switch 563 adjacent to the failed link has been activated so the protection interconnection fiber is connected back to the working interconnection fiber.

The data is then transferred from network node 507 to working fiber 553 to network node 513 to destination $D_2$ 525. The data path from $S_2$ to $D_2$, after the link failures, passes through node 513 on its way to network node 517 because the data path follows the protection cycle to the network node on the other side of the failed link. The data was only transferred back to the working fibers at network node 507, which was on the other side of the failed link. In a distributed automatic protection switching system, network node 513 is unaware of the link failure since the links surrounding network node 513 have not failed. This feature of pre-assigned protection cycles allows for fast switching to a protection route and ensures a valid data path without requiring any centralized processing to determine a protection route. The protection cycles ensure that the data will arrive at the other side of the failed link and ultimately to its destination.

Each network node can send one of three commands to its protection switches (via a network node controller located within the network node and connected to each of the protection switches) to achieve signal path restoration after a link failure. The network node can send a "clear" command, a "lockout protection" command or a "switch to protection" command. The "switch to protection" command is issued when a node detects the failure of an incident link and switches the data from the working interconnection fibers onto the protection interconnection fibers and vice-versa as shown in FIG. 2B. All other protection switches remain in their default positions (BAR state). The protection switching performed at the network nodes adjacent to the failed link allows for the data path to circumvent the failed link by reaching the network node on the other side of the failed link using the protection fibers in the appropriate protection cycle. Once the data reaches the network node at the other side of the failed link, the data is switched back to the working fibers to continue on its path to its assigned destination.

Once a failure occurs, a "lockout" protection command will prevent further switching of the protection switches involved in restoring that failure. Otherwise, the original protection cycle may be interrupted in an attempt to repair a second failed link. After a link failure is restored, the "clear" command is issued first for the protection switches in the two network nodes on both sides of the restored link, and subsequently to all protection switches in the protection cycle used for restoration, and the protection switches are returned to their default (BAR) state and are not "locked."

The above discussion focuses on networks with planar topologies; however, the inventive technique can be extended to networks with non-planar topologies as well. A non-planar bridgeless graph has an orientable cycle double cover, which means that each bi-directional edge in a network will appear in exactly two directed cycles, one in each direction. A graph corresponding to a network (of any topology) has bi-directional edges corresponding to the protection fibers in the network. Each bi-directional edge consists of a pair of directed edges in opposite direction. Thus said edges can be divided into directed cycles such that each directed edge appears in exactly one directed cycle and both directions of a single bi-directional edge does not appear in the same directed cycle. Therefore, protection cycles with the characteristics previously defined can always be found for networks with non-planar topologies.

The directed cycles can be determined in a non-planar graph by applying a conventional algorithm called backtracking (also called branch and bound algorithm) together with a novel algorithm that checks and ensures that the constraints imposed on the directed cycles discussed above are followed. Backtracking is well known in the art. (See e.g., *Combinatorial Algorithms*, by T. C. Hu, Chapter 4, pages 138–161, Addison Wesley Publishing Company, 1982; which is hereby incorporated by reference). While backtracking can be computationally complex the protection cycles can be determined before the network is in actual use so that a large computation time is not a concern. Other conventional methods of determining the directed cycles may also be used. Once the protection cycles are in place, there is no need for further calculations in operating the automatic protection switching system.

A network configuration of network nodes and links can be tested to determine if a network has a planar topology or not, by using a planar testing algorithm well known in the art. (See e.g., *Algorithmic Graph Theory*, by Alan Gibbons, page 85–93, Cambridge University Press, 1985; which is hereby incorporated by reference). Once a determination is made of whether the network has a planar topology or not, the protection cycles for that particular type of network can be found and implemented in the network.

The automatic protection switching system of the present invention can also protect against switch failures in the network. In the preferred embodiment of an optical network, the center switch will be an optical switch. It could also be any type of conventional switching device depending upon the type of network being protected. In order to achieve center switch protection, the protection switches in the network nodes must be slightly modified.

Figure 6A:
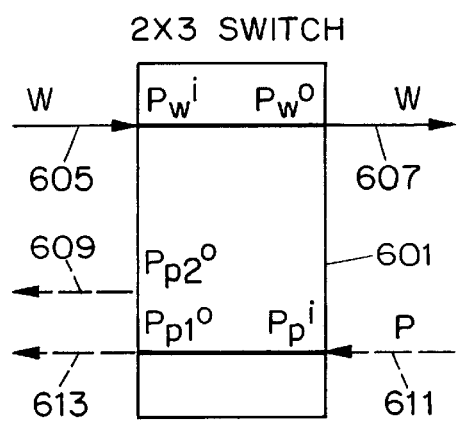
FIG. 6A shows a 2×3 protection switch within a node.
Figure 6B:
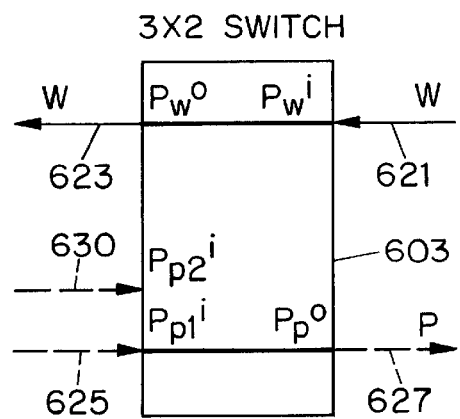
FIG. 6B shows a 3×2 protection switch within a node.

FIGS. 6A and 6B show[s] the modified protection switches (located within a network node) which are used in this invention to protect against center failure. In FIG. 6A, switch 601 is a 2×3 protection switch (two inputs and three outputs). In FIG. 6B, switch 603 is a 3×2 protection switch (three inputs and two outputs). Switch 601 has a working interconnection fiber 605 input, a working fiber 607 output, a first protection fiber 611 input, a first protection interconnection fiber 613 output and a second protection interconnection fiber 609 output. Protection switch 603 has a working fiber 621 input, a working interconnection fiber 623 output, a protection fiber 627 output, a first protection interconnection fiber 625 input and a second protection fiber 630 input. The protection switches 601 and 603 shown in FIGS. 6A and 6B, respectively, are placed in the same manner within the network node as the 2×2 protection switches used only for link failure protection. The only difference is that there are now some additional protection interconnection fiber connections among the protection switches in the network nodes. There are three different possible switch states for each 3×2 protection switch. The first switch state is "BAR-1" which occurs in the default state and connects the protection fiber to the first protection interconnection fiber and the working fiber to the working interconnection fiber. For example, in switch 601 shown in FIG. 6A, protection fiber 611 is connected to first protection interconnection fiber 613 and working fiber 607 is connected to working interconnection fiber 605. The second switch state "BAR-2" connects the protection fiber to the second interconnection fiber and the working fiber to the working interconnection fiber. For example, protection fiber 611 is connected to first protection interconnection fiber 609 and working fiber 607 is connected to working interconnection fiber 605. The third switch state is the "Cross" state where the protection fiber is connected to the working fiber and the working interconnected fiber is connected to the first protection interconnection fiber. For example, protection fiber 611 is connected to first working fiber 607 and working interconnection fiber 605 is connected to first protection interconnection fiber 613.

In the present invention, only center switch failures in networks with planar topologies are discussed. Out of all connections going through the "failed" network node, only a single priority connection can be restored. Priorities are set up for all connections in the network and the "failed" network node will switch the protection switches appropriately so that the highest priority connection passing through it is restored. The approach is the same as for the link failures in planar networks. The planar network is modeled as a planar graph; it is then drawn on the plane and the inner and outer faces are found. The directed cycles are then formed as described previously. The only difference is that in this case the first protection interconnection fibers are used to create the protection cycles after the corresponding directed cycles are determined. The method to do this is the same as explained above. The second protection interconnection fibers are used to interconnect the protection switches terminating the protection fibers contained in the same link.

Each network node in the network can detect a center switch failure by internal or external monitors. Any monitoring system, e.g., power loss detection, can be used for detection of the center switch failure depending on the type of network center switch being protected.

In the event of a center switch failure, all of the protection switches within the network node containing the center switch that failed ("failed network node") will be switched. The protection switches with terminating working fibers on the priority path are switched from BAR state to Cross state while all other protection switches in that network node are switched from the BAR-1 state to the BAR-2 state. The configuration ensures that the failure at the center switch will be circumvented because the data will flow along the second protection interconnection fibers while within the "failed" network node and along the protection cycles outside the "failed" network node until they reach the priority working fiber on the other side of the "failed" network node.

Figure 7:
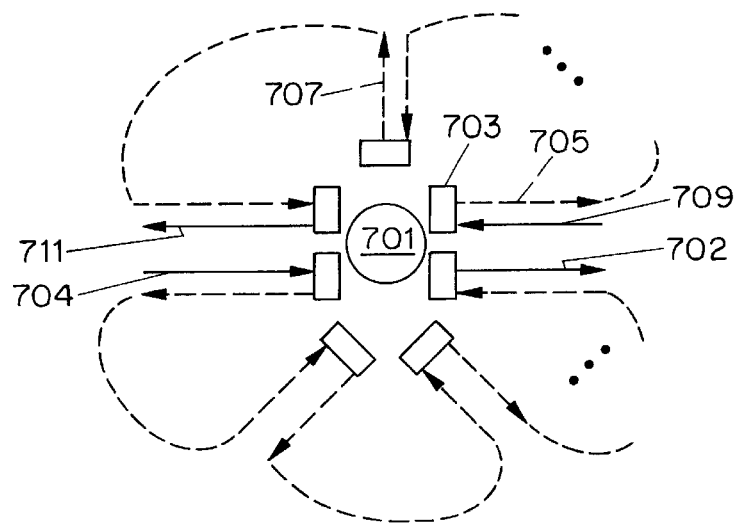
FIG. 7 shows a diagram of protection cycles adjacent to a node in a network.

FIG. 7 shows the configuration of the protection cycles after center switch 701 failed and the protection switches in the network node were activated. FIG. 7 also shows a number of protection switches in the network node which interface with the incoming and outgoing fibers. For example, protection switch 703 has a working fiber 709 as an input and a protection fiber 705 as an output. The configuration of the protection cycles in this example corresponds to the restoration of priority connection consisting of working fibers 702, 704, 709 and 711. After the center switch fails, the signal from working fiber 709 is placed on the protection fiber 705 to be transported around the "failed" network node to the priority path on the other side of the "failed" network node. If the data happens to return to the "failed" network node (as is the case in this example) and that particular path is not the priority path, the data enters and exists the "failed" network node via the second protection cycle. Eventually the data will reach the priority path on the other side of the "failed" network node and be switched back on the correct working fiber.

FIG. 8 shows the connections within the network node 801 after a center switch failure has occurred in network node 801. The center switch failure incapacitates the center switch which can no longer be used for routing information in the network. FIG. 8 shows network node 801 with three sets of both protection switches 601 and protection switches 603, where each pair is associated with a particular connection direction in this example (west, north and 25 east). The center switch 803 of network node 801, which connects the data between the protection switches oriented in different directions has failed as indicated by the "X" 805. When a center switch failure is detected inside the network node, the network node checks the priorities for all connections going through and finds the connection with the highest priority. For this example, working fibers 811, 825, 827 and 829 are used in the highest priority connection. The protection switches 855, 857, 859 and 867 terminating the fibers used for the priority connection will then switch from the BAR-1 to the Cross state in order to prevent the data from flowing into the failed center switch. Protection switches 863 and 865, not terminating the fibers used for the priority connection will switch from the BAR-1 state to the BAR-2 state. In this example, where priority data is coming into the "failed" network node on working fiber 811, it is switched onto the protection fiber 813. The protection cycles are 831, 833 and 835 with the orientations shown in FIG. 8 so, the data is then transmitted along protection cycle 831 and is placed onto protection fiber 815 which comes into protection switch 863 at the north side (top of Figure) of the network node. The second protection interconnection fiber 817 then directs the data from protection switch 863 to protection switch 865 at the north side of the network node. The data is then placed on another protection cycle 833 through protection fiber 819. After following protection cycle 833, the data returns to the "failed" network node via protection fiber 823 into protection switch 859 at the east side of the node. The protection switch 859 has been previously activated to connect the protection fiber to the working fiber to allow the priority data to continue through the network on to its destination. Instead of traveling through the "failed" network node, the data reached its proper destination going around the failed center switch of the network node using the protection cycles. Network node 801 also allows the designated priority data to travel in the opposite direction. A similar path is followed by the priority data flowing in the opposite direction which uses protection cycles which were not used for the first priority data path around the failure.

If there was not a center switch failure, but a link failure instead, then the second protection interconnection fibers would not be utilized and all connections through the failed link would again be restored. For example, in FIG. 8 if network link 871 fails, protection switches 85S and 857 change from the BAR-1 state to Cross state while the other protection switch in the node remains in the BAR-1 state.

Figure 9:
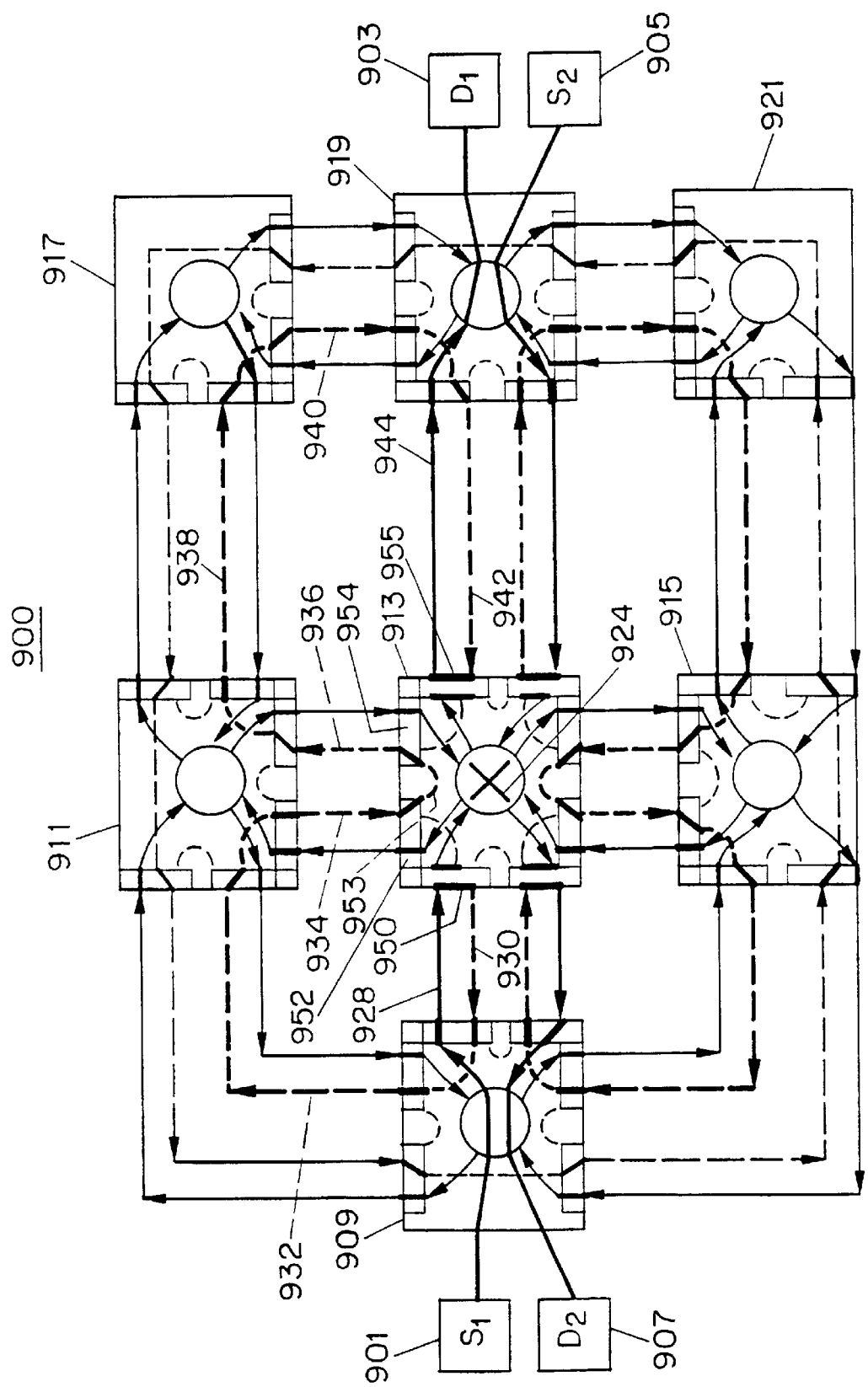
FIG. 9 shows a seven node network after a failure in one node.

FIG. 9 shows a planar network with seven network nodes after a single switch failure. Network 900 includes network nodes 909, 911, 913, 915, 917, 919 and 921. A failure in the optical switch in network node 913 is shown by the "X" 924.

A data path needs to be established from source S, 901 to destination D₁ 903. A second data path needs to be established from source S₂ 905 to destination D₂ 907. If a center switch failure had not occurred, the data from S₁ 901 in network node 909 would travel to network node 913 to destination D₁ 903 in network node 919 as the most direct route. However, because of the failure in the center switch of network node 913, the data cannot pass through network node 913. When the failure occurs, the priority bi-direction data path is selected (from all data paths traveling through the network node) and those protection switches along that path in the "failed" network node are activated to switch data from the working fibers to the protection fibers and vice-versa. All other protection switches in the "failed" network node are switched from the first protection interconnection fibers to the second protection interconnection fibers. This allows the data traveling over the priority path to avoid the "failed" network node (will not use the failed center switch in that network node) by being switched to the protection cycles to travel around the network node with the failed center switch.

FIG. 9 shows the setting on the protection switches after the center switch failure has been detected. The data from source S₁ 901 in the network node 909 travels along working fiber 928. Protection switch 950 of network node 913 has been activated such that the data is now placed on protection fiber 930. The data that flows, from protection fiber 930 through network node 909 and onto protection fiber 932 following the pre-designated protection cycle (shown by dashed bolded arrows). Protection switch 952 is activated such that the data is transferred onto second protection interconnection fiber 953 within network node 913 which avoids the failed center switch. The data then travels through network node 913 and onto protection fiber 936. The data is now following a second protection cycle (also shown by dashed bolded arrows). The data travels through network node 911 onto protection fiber 938 and then through network node 917 onto protection fiber 940. The data then flows through network node 919 onto protection fiber 942 to complete the protection cycle. Protection switch 955 has been activated such that the protection fibers are re-connected to the working fibers because the destination at the other side of the "failed" network node has been reached. The data then continues on with its normal path along working fiber 944 to destination D₁ 903 in network node 919.

The only protection switches that were activated in the entire network were in network node 913. All the other network nodes did not have to activate any protection switch nor did any centralized intelligence become necessary. The data simply followed the pre-assigned protection cycles it was placed on. This is a important benefit to the APS system of the present invention which does not depend on the connection state of the network when the failure occurred.

The activated protection switches in "failed" network node 913 also allow the data to travel around network node 913 is the opposite direction, from S₂ 905 to destination D₂ 907. The data travels from source S₂ to network node 919 to network node 913 where it follows two protection cycles to eventually arrive at destination D₂ in network node 909.

The protection cycle configuration of the present invention allows for a maximum restoration of $\lfloor f/2 \rfloor$ simultaneous center switch failures when bi-directional connections are restored and a maximum restoration of (f−1) simultaneous center switch failures when uni-directional connections are restored, when f represents the total number of faces when the network is represented by a plane directed graph. The present invention guarantees restoration of a single priority connection after any single center switch failure, and allows for possible restoration of simultaneous multiple center switch failures (restoring one priority connection per failure) depending on the position of the failures.

Each network node now sends one of four commands to its protection switches (via a network node controller) to achieve signal path restoration for a priority connection after a center switch failure. The network node can send a "clear" command, a "lock protection" command, a "switch to protection" command (to a Cross state) and a "switch to second protection" command (to a BAR-2 state). The "switch to protection" command is issued when the network node detects a center switch failure to the protection switch to a priority path. The "switch to second protection" command is also issued when the network node detects a center switch failure to the rest of the protection switches in the node. All other protection switches in the network remain in the default state (BAR-1 state). The protection switching performed at the network node where the center switch failed allows the priority data path to circumvent the failed center switch by reaching the priority path on the other side of the "failed" network node using the protection fibers in the appropriate protection cycles. Once the data reaches the other side of the network node in question, the data is switched back to the working fibers to continue on its path to its assigned destination.

Once a failure occurs, a "lockout protection" command will prevent further switching from a working to protection port or vice-versa and from a first protection interconnection port to a second protection interconnection port. Otherwise, the original protection cycle(s) required for priority data restoration may be interrupted in an attempt to repair a second failure. After a center switch failure is restored, the "clear" command is issued first for the protection switches in the "failed" network node, and subsequently to all protection switches in the protection cycle(s) used for restoration, and the protection switches are returned to their default (BAR-1) state and are not "locked."

Figure 10:
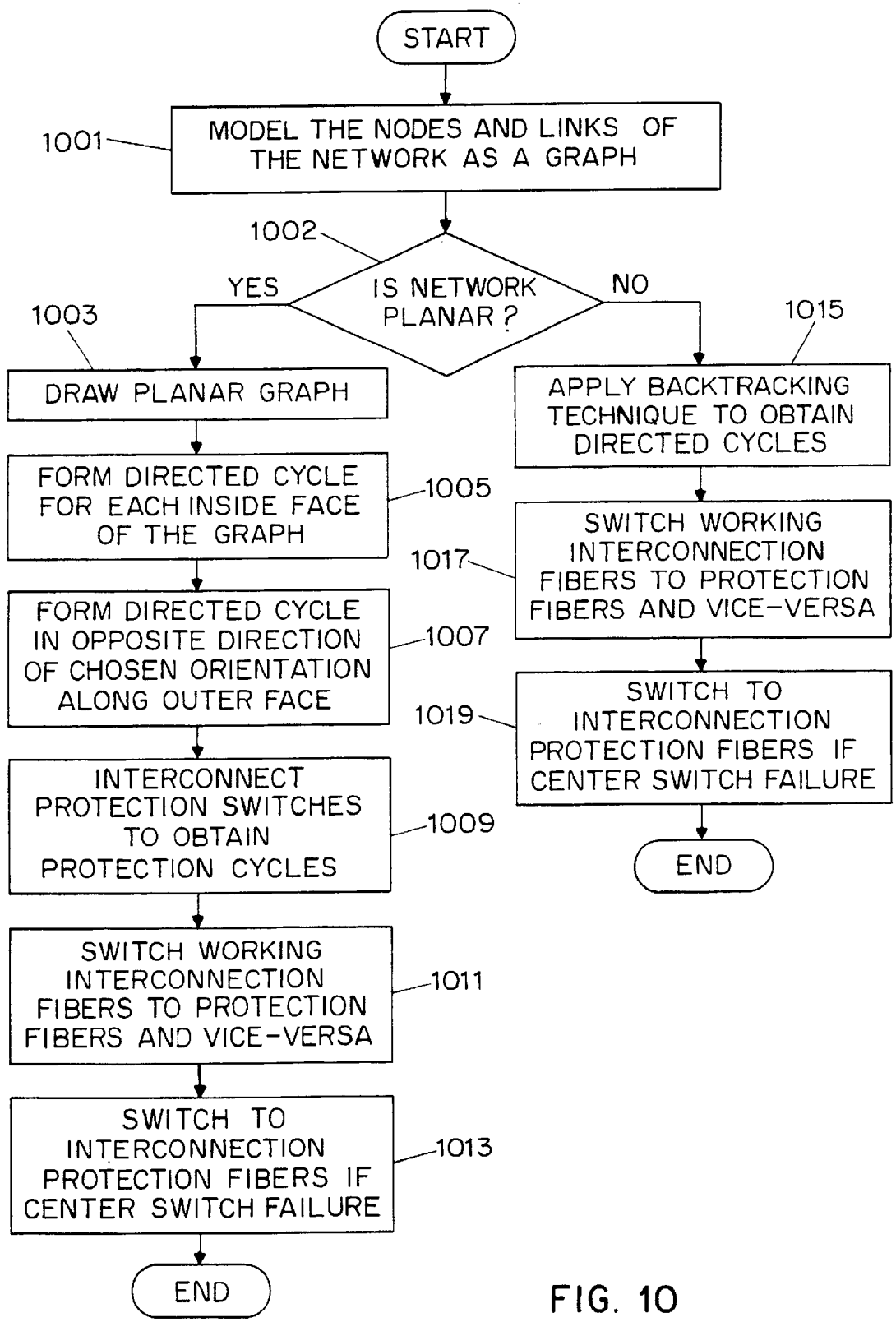
FIG. 10 shows a flow chart of the steps for providing an automated protection system for a network.

FIG. 10 shows the steps for a method of providing an automatic protection switching system for a network. Step 1001 models the network comprised of network nodes and links as a directed graph with vertices and edges corresponding to the network nodes and protection fibers, respectively. Step 1002 runs a conventional testing algorithm to decide whether the network has a planar topology or not.

If the network is planar as determined in step 1002 the following steps apply: Step 1003 draws the planar graph on the plane to obtain a plane graph with inner faces and an outer face. Step 1005 forms directed cycles with a chosen orientation for each inner face of the graph. All directed cycles along the inner faces of the graph will be oriented in the same direction, clockwise or counter-clockwise. Step 1007 forms a directed cycle in the opposite direction than the chosen orientation along the outer face. Step 1009 interconnects the protection switches terminating the protection fibers with protection interconnection fibers as previously described to obtain protection cycles corresponding to the directed cycles found in the graph representation of the network.

Steps 1001, 1002, 1003, 1005, 1007, 1009 are all performed prior to the actual operation of the network and therefore the time it takes to determine the protection cycles does not affect the network's response time and is not a constraint on adequately protecting the network. These steps will preferably be performed on a conventional computer, or in simple networks will be done manually.

Step 1011 switches the working interconnection fibers onto the protection interconnection fibers and vice-versa if a link failure occurs as described in FIG. 2B. This allows the data to be carried by the protection fibers in the protection cycles to the network node on the other side of the link failure without signaling or alerting any network node other than the network nodes on both sides of the link failure. Because the automatic protection switching system can be set up before the activation of the network and because its configuration doesn't depend on the active connection in the network, no additional delays or communications are necessary to remedy the link failure until the link is repaired.

Step 1013 protects against center switch failures using the 2×3 and 3×2 protection switches as described with FIG. 6. If node failure protection is not desired, the step will be skipped. First protection interconnection fibers are now used to create the protection cycles and second protection interconnection fibers are used to interconnect the protection switches terminating the protection fibers belonging in the same link. The data will now follow the protection cycles until it reaches the priority path on the other side of the "failed" network node where it is switched back to the working fiber and continues to its destination. Previous protection attempts could not compensate for a center unit failure without drastic rerouting of all data paths around the node. The automatic protection switching system of the present invention allows the protection cycles to be set up before the network's operation and its configuration doesn't depend on the active connections in the network.

If the network is not planar as determined in Step 102 the following steps apply: Step 1015 applies a suitable technique, such as a backtracking technique, to obtain the directed cycles with the special characteristics mentioned above. Step 1017 interconnects the protection switches terminating the protection fibers with protection interconnection fibers as described above as to obtain protection cycles corresponding to the directed cycles found in the graph representation of the network.

Steps 1015 and 1017 are also performed prior to the actual operation of the network and therefore the time it takes to determine the protection cycles does not affect the network's response time and is not a constraint on adequately protecting the network. The steps will preferably be performed on a conventional computer, or in simple networks will be done manually.

Step 1019 switches the working interconnection fibers onto the protection interconnection fibers and vice-versa if a link failure occurs as described in FIG. 2B. This allows the data to be carried by the protection fibers in the protection cycles to the network node on the other side of the link failure.

An automatic protection switching system for a network can also be provided for a network with a bridge. The bridge is simply disconnected in the modeled network since the bridge cannot be restored as previously described.

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

What is claimed is:

1. An automatic protection switching system for a network comprising; a plurality of nodes;

a plurality of pairs of first and second primary conduits connected between said nodes wherein each said first primary conduit's data flows in a direction opposite of said second primary conduit in said pair; and a plurality of pairs of first and second protection conduits connected between said nodes, wherein each said protection conduit is oriented to form one and only one predetermined protection cycle of at least three predetermined protection cycles.

2. The system of claim 1, wherein said conduits are optical fibers.

3. The system of claim 2, wherein each said node comprises optical switches.

4. The system of claim 1, wherein said nodes comprise protection switches and said transmission direction of said primary and protection conduits is predetermined for said system.

5. The system of claim 4, wherein at least one said protection switches connects at least one said primary conduit to at least one said protection conduit when a failure occurs in one of said primary conduits connected to said node.

6. The system of claim 1, wherein at least one node further includes a means for detecting a failure within a node connecting said primary conduit.

7. The system of claim 6, wherein said at least one node connects at least one said primary conduit in said node to at least one said protection conduit responsive to said detection means.

8. The system of claim 1, further including at least one third protection conduit within at least one node in said system.

9. The system of claim 8, wherein said at least one node with a said third protection conduit further includes a means for detecting a failure within said node.

10. The system of claim 9, wherein said at least one node connects respective protection conduits that are part of two protection cycles using one said third protection conduit responsive to said detection means.

11. The system of claim 1, wherein said network is a non-planar network.

12. An automatic protection switching system for insuring a working data pass in a network comprising:

A plurality of nodes; and a plurality of links wherein said links comprise a first and second primarily conduit connected between two of said nodes and a first and second protection conduit connected between two of said nodes, wherein each of said protection conduits is oriented to form one and only one of at least three predetermined protection cycles a respective one of which can become part of said data path if at least one fault occurs in said network, and wherein said system is capable of ensuring a working data path in said network if two or more said faults occur.

13. The system of claim 12, wherein said at least one fault includes a fault in one of said conduits.

14. The system of claim 12, wherein said at least one fault includes a fault in one of said nodes.

15. The system of claim 12, wherein said conduits are optical fibers.

16. The system of claim 15, wherein each said node comprises optical switches.

17. The system of claim 12, wherein said nodes comprise switching stations and said primary and protection conduits' said orientation is predetermined for said system.

18. A method for providing an automated protection system for a network which comprises nodes and connecting links, comprising the steps of:

modeling said nodes and connecting links in said network as a graph, wherein each said link comprises at least one working conduit and at least one corresponding protection conduit;

forming a protection cycle in a predetermined direction for each inside face in said graph;

forming a protection cycle in an opposite direction to said predetermined direction along said graph's outside face, wherein there are formed at least three predetermined protection cycles;

orienting each said protection conduit in the network to form one and only one of the predetermined protection cycles; and switching a data path from at least one said working conduit in a first said node with one of said corresponding protection conduits in said first node if a failure occurs in one of said links connected to said first node.

19. The method of claim 18, wherein said switching step connects said at least one working conduit to said one of said corresponding protection conduit oriented in the opposite direction to said at least one working conduit.

20. The method of claim 18, further including the step of switching a data path from a first protection conduit that is part of first predetermined protection cycle to a second protection conduit that is part of a second predetermined protection cycle using a third protection conduit within a second node if a failure occurs within said node.

* * * * *